(12) United States Patent
Graves

(10) Patent No.: US 6,893,072 B1
(45) Date of Patent: May 17, 2005

(54) COVER SYSTEM

(76) Inventor: Jomoko Graves, 3159 Wendover Dr., Toledo, OH (US) 43606

( * ) Notice: Subject to any disclaimer, the term of this patent is extended or adjusted under 35 U.S.C. 154(b) by 0 days.

(21) Appl. No.: 10/603,299

(22) Filed: Jun. 25, 2003

(51) Int. Cl.[7] .............................................. B60P 7/02
(52) U.S. Cl. .......................... 296/100.12; 296/100.15; 296/105
(58) Field of Search ...................... 296/100.12, 100.18, 296/105, 100.03, 100.01, 100.11, 100.05, 296/37.16, 100.06, 100.07, 100.09, 37.6, 296/100.16, 100.1, 165, 100.04

(56) References Cited

U.S. PATENT DOCUMENTS

| | | | |
|---|---|---|---|
| 3,688,787 A | * | 9/1972 | Feather .................. 296/100.12 |
| 5,080,423 A | * | 1/1992 | Merlot et al. ................ 296/105 |
| 5,690,377 A | * | 11/1997 | Denyer ................... 296/100.15 |
| 6,142,554 A | * | 11/2000 | Carroll et al. .......... 296/100.12 |
| 6,257,260 B1 | * | 7/2001 | Phillips ....................... 296/105 |
| 6,431,634 B1 | * | 8/2002 | Ananian ................. 296/100.12 |
| 6,481,779 B1 | * | 11/2002 | Gothier et al. .......... 296/100.12 |
| 6,546,943 B2 | * | 4/2003 | Lin .............................. 135/95 |
| 2002/0135199 A1 | * | 9/2002 | Hanning ................. 296/100.12 |

FOREIGN PATENT DOCUMENTS

FR          2653478      * 4/1991

* cited by examiner

Primary Examiner—Kiran Patel

(57) ABSTRACT

A cover system for covering a cargo area of a vehicle. The cover system includes an elongate track assembly and a cover assembly. The track assembly is mountable to an upper surface of a pair of sidewalls of a vehicle and the cover assembly is retractably mounted to the track assembly. At least one drive assembly is mounted to the cover assembly for retractably moving the cover assembly between first and second positions.

11 Claims, 6 Drawing Sheets

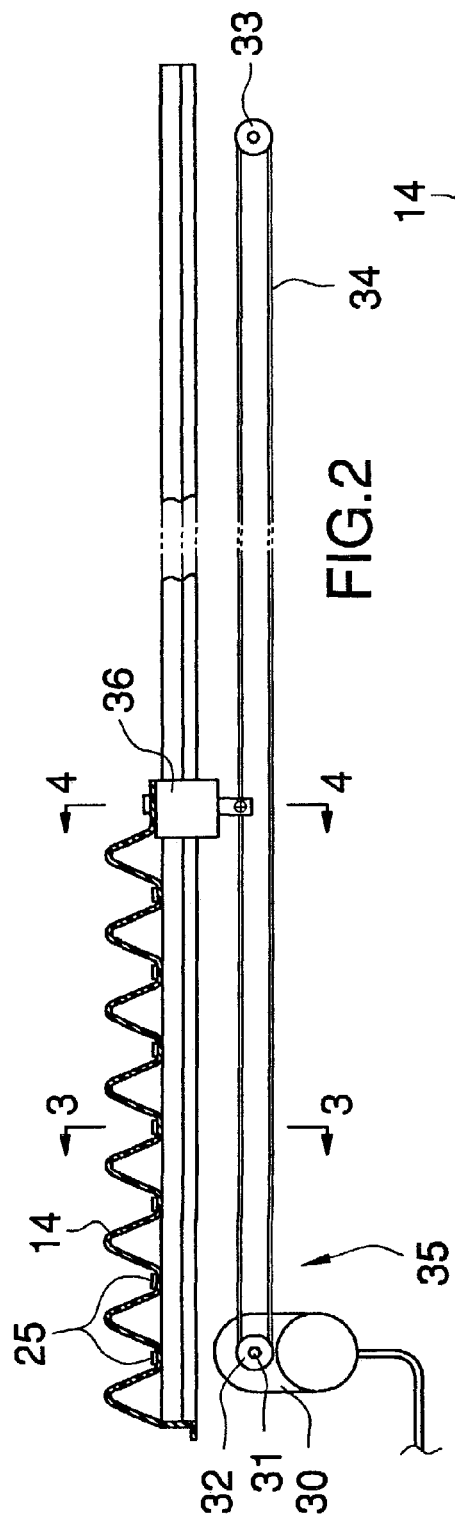
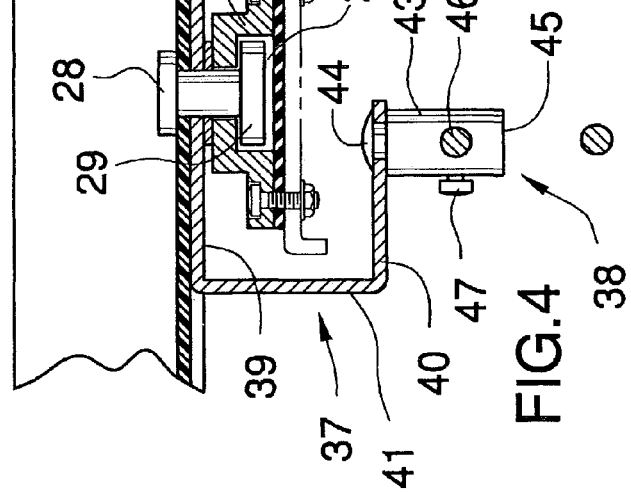
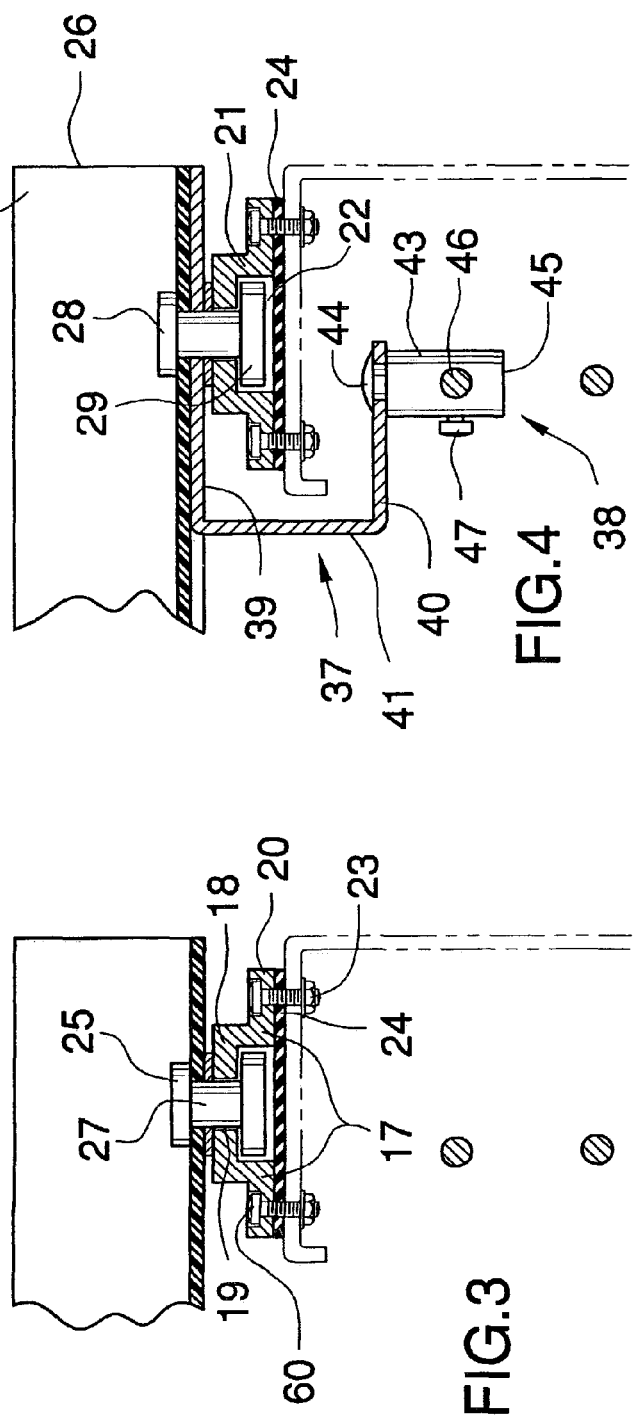

COVER SYSTEM

BACKGROUND OF THE INVENTION

1. Field of the Invention

The present invention relates to cargo area covers and more particularly pertains to a new cover system for covering a cargo area of a vehicle.

2. Description of the Prior Art

The use of cargo area covers is known in the prior art. More specifically, cargo area covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,094,499; U.S. Pat. No. 5,829,819; U.S. Pat. No. 1,861,277; U.S. Pat. No. 4,083,596; U.S. Pat. No. Des. 379,173; and U.S. Pat. No. 6,186,580.

Since the invention of trucks and other vehicles that have cargo areas, people have tried to invent means of covering them in order to protect the vehicle's cargo. These conventional devices have taken many forms. They range from toppers that have windows and doors to flexible covers that snap onto fasteners mounted on the vehicle. All of these devices require some manual manipulation on the part of the user. The present invention on the other hand permits a user to operate the cover system from inside a cabin of a vehicle.

In this respect, the motorized cover system according to the present invention substantially departs from the conventional concepts and designs of the prior art, and in so doing provides an apparatus primarily developed for the purpose of covering a cargo area of a vehicle.

SUMMARY OF THE INVENTION

In view of the foregoing disadvantages inherent in the known types of cargo area covers now present in the prior art, the present invention provides a new cover system construction wherein the same can be utilized for covering a cargo area of a vehicle.

The general purpose of the present invention, which will be described subsequently in greater detail, is to provide a new cover system which has many of the advantages of the cargo area covers mentioned heretofore and many novel features that result in a new cover system which is not anticipated, rendered obvious, suggested, or even implied by any of the prior art cargo area covers, either alone or in any combination thereof.

While the conventional devices fulfill their respective, particular objectives and requirements, the aforementioned patents do not disclose a new cover system. The inventive device includes an elongate track assembly that is mountable to an upper surface of a pair of sidewalls of a vehicle. A cover assembly having a cover member is retractably coupled to the elongate track assembly. A means of retractably moving the cover member is operationally coupled to the cover member.

An object of the present invention is to provide a new cover system for covering a cargo area of a vehicle.

Another object of the present invention is to provide a new cover system that permits a user to remain in a cabin of a vehicle while manipulating a cargo area cover. The ability to remotely manipulate the cover member permits a user to quickly cover and protect valuable cargo during adverse weather conditions, without being exposed to the elements.

Even still another object of the present invention is to provide a new cover system that is lightweight thereby reducing the amount of weight added to a vehicle.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

There has thus been outlined, rather broadly, the more important features of the cover system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the present invention taken along line 2—2 of FIG. 1.

FIG. 3 is a cross sectional view of the present invention taken along line 3—3 of FIG. 2.

FIG. 4 is a cross sectional view of the present invention taken along line 4—4 of FIG. 2.

DESCRIPTION OF THE PREFERRED EMBODIMENT

Figure 1:
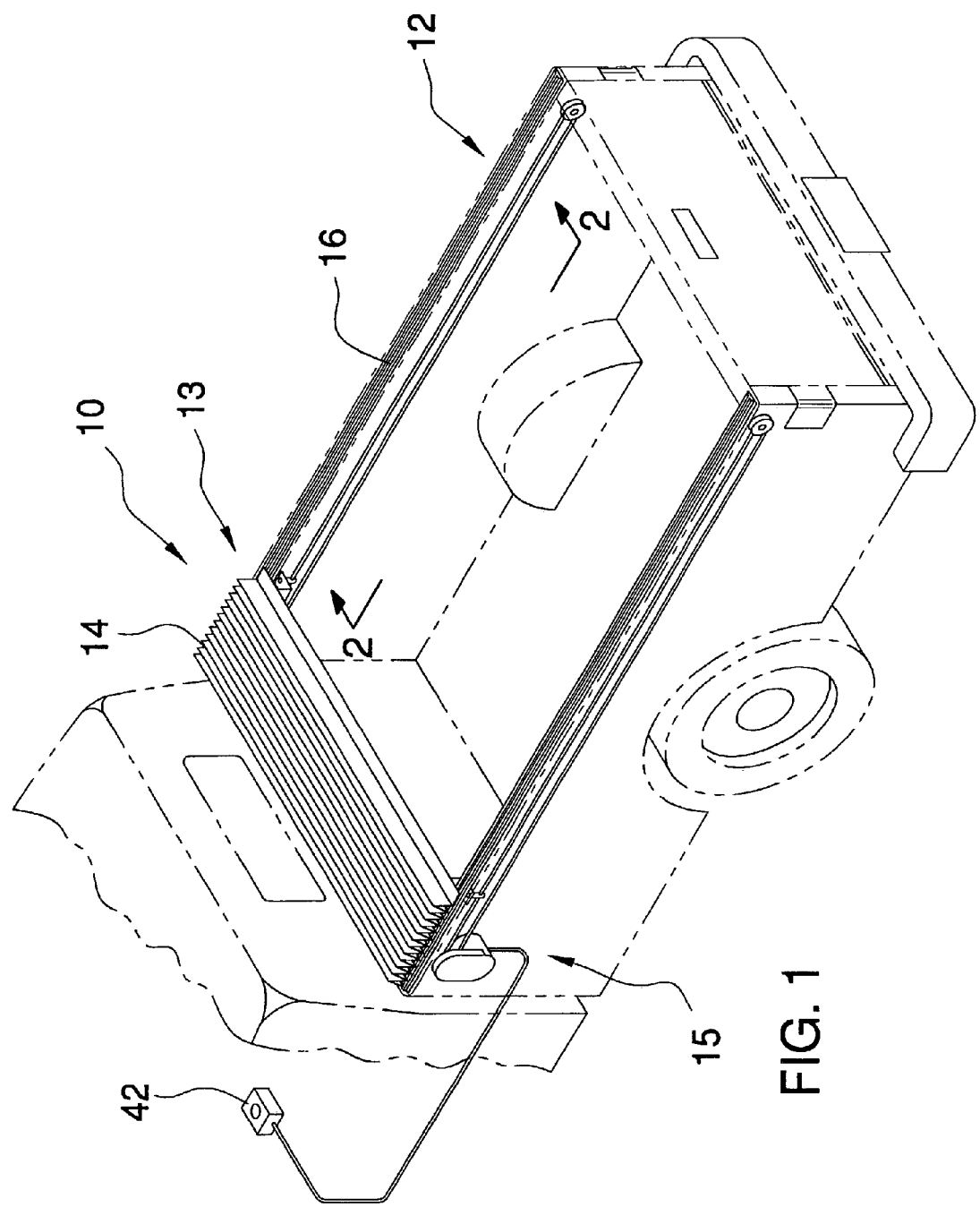
FIG. 1 is a perspective view of a new cover system according to the present invention.

With reference now to the drawings, and in particular to FIGS. 1 through 8 thereof, a new cover system embodying the principles and concepts of the present invention and generally designated by the reference numeral 10 will be described.

As best illustrated in FIGS. 1 through 8, the cover system 10 generally comprises an elongate track assembly 12 that is mountable to an upper surface of a pair of sidewalls of the vehicle. A cover assembly 13 is provided that includes a cover member 14 for covering the cargo area of a vehicle. The cover member 14 is retractably mounted to the track assembly 12. At least one drive assembly 15 is mounted to the cover assembly 13 for retractably moving the cover member 14 between a first position and a second position.

The first position of the cover member 14 is characterized by the cover member 14 extending across a cargo area and blocking access thereto. The second position, as particularly illustrated in FIG. 1, is characterized by the cover member 14 not extending across the cargo area such that the cargo area is accessible to a user.

The track assembly 12 may include a pair of track members 16 with each of the track members 16 being mountable to an upper surface of a respective sidewall of the vehicle. As illustrated in FIG. 1, each of the track members 16 may have a length approximately equal to a length of each of the sidewalls of the vehicle.

As illustrated in FIGS. 3 and 4, each of the track members 16 may include a pair of longitudinal track sections 17 that are preferably positioned generally side by side. Each of the track sections 17 may include a first longitudinal flange 18 and a second longitudinal flange 20. The first longitudinal flange 18 of each of the track sections 17 may extend toward each other with an edge of each of the first longitudinal flanges 18 defining a space 19. The second longitudinal flange 20 may be provided for securing each of the track sections 17 to the sidewall of the vehicle.

A longitudinal coupling portion 21 preferably extends between and is coupled to the first 18 and second 20 flanges such that the first longitudinal flange 18 extends away from an inner surface of the longitudinal coupling portion 21 and the second longitudinal flange 20 extends away from an outer surface of the coupling portion 21.

In one embodiment of the present invention, the longitudinal coupling portion 21 and each of the first flanges 18 defines a longitudinal channel 22 that extends the length of the track members 16.

A means of fastening 23 each of the track sections 17 to the sidewall of the vehicle may be provided. The means of fastening 23 may extend through the second longitudinal flanges 20 and may extend through the sidewall of the vehicle. In one embodiment of the present invention as particularly illustrated in FIGS. 3 and 4, the means of fastening 23 may comprise a nut and bolt. However, other means of fastening each of the track sections 17 to the sidewall of the vehicle may also be provided.

As illustrated in FIGS. 3 and 4, an upper surface of each of the second flanges 20 may have a plurality of bores 60 extending therein for receiving the means of fastening 23 each of the track sections 17 to the sidewalls of the vehicle. Each of the bores 60 permit the means of fastening 23 to be countersunk preventing the means of fastening 23 from interfering with movement of the cover member 14 between its first and second positions.

In one embodiment of the present invention, a longitudinal intermediate member 24 may be positioned between the second flanges 20 and an upper surface of the sidewall of the vehicle to prevent movement of the track sections 17. The longitudinal intermediate member 24 may comprise a resiliently flexible material such as a sheet of rubber. However, other types of materials may also be employed.

As illustrated in FIGS. 3 and 4, the cover assembly 13 may include a plurality of spaced mounting members 25 that are preferably mounted to the cover member 14 and positioned generally adjacent to lateral edges 26 of the cover member 14. An end of each of the spaced mounting members 25 is preferably slidably mounted to the longitudinal channel 22 of each of the track members 17.

In one embodiment of the present invention, each of the spaced mounting members 25 may include a post 27 that is extendable through the cover member 14 and extendable through the space 19 between the edges of the first longitudinal flanges 18. A first annular member 28 may be mounted to an end of the post 27 and may be positioned generally adjacent to the cover member 14. A second annular member 29 may be mounted to an end of the post 27 and is preferably slidably positionable in the longitudinal channel 22. The plurality of mounting members 25 may comprise a substantially rigid material such as, for example, aluminum, steel or a plastic material. However, other types of materials may also be employed.

In one embodiment of the present invention, the cover member 14 may comprise a generally flexible material such as, for example, a vinyl or plastic material. However, other generally flexible materials may be employed. As illustrated in FIG. 1, when the cover member 14 is in the second position it may have a generally accordion transverse cross section taken substantially parallel to a longitudinal axis of the cover member 14.

In one embodiment of the present invention, the at least one drive assembly 15, may comprise a pulley system 35. The pulley system 35 may include a motor 30 that has a motor shaft 31 extending away therefrom. The motor 30 may be mountable to an inner surface of the sidewall of the vehicle and may be positionable nearer the end wall of the vehicle than the gate of the vehicle. The motor 30 may comprise a conventional motor. However, other types of motors may also be employed. The motor 30 may include a reduction gearbox for regulating the rotational speed of the motor thereby regulating the movement of the cover member 14.

A first pulley 32 may be rotatably mounted to the motor shaft 31. The motor 30 and the motor shaft 31 may be orientated generally perpendicular to an inner surface of the side wall of the vehicle such that a plane of the first pulley 32 is orientated generally parallel to the sidewall of the vehicle. A second pulley 33 may be rotatably mounted to the sidewall of the vehicle and may be positionable generally nearer the gate of the vehicle than the end wall of the vehicle.

As illustrated in FIG. 2, a flexible line 34 is mounted about and extends between the first 32 and second 33 pulleys. The flexible line 34 may comprise a generally flexible material such as, for example, a metal wire or nylon rope. However, other types of materials may also be employed.

As particularly illustrated in FIG. 2, the pulley assembly 15 may also include a carriage member 36 that is mounted to and extends between the flexible line 34 and the cover member 14. The carriage member 36 moves the cover assembly 13 between the first and second positions. In one embodiment of the present invention, the carriage member 36 may include a bracket 37 that is coupled to the cover member 14. A coupling assembly 38 may be provided for coupling the bracket 37 to the flexible line 34 with the flexible line 34 extending through the coupling assembly 38.

As illustrated in FIGS. 3 and 4, the bracket 37 may include a first flange 39 that is mounted to the cover member 14 and orientated generally parallel to an upper surface of the cover member 14. The mounting members 25 of the cover assembly 13 may extend through the cover member 14 and may extend through the first flange 39 of the bracket 37.

A second flange 40 may be mounted to the coupling assembly 38 and may be orientated generally parallel to the first flange 39 of the bracket 37. An intermediate member 41 may extend between and may be coupled to the first 39 and second 40 flanges of the bracket 37. The bracket 37 may comprise a substantially rigid material such as, for example, an aluminum, steel or plastic material. However, other types of materials may also be employed.

The coupling assembly 38 may include a shaft 43 that has first 44 and second 45 opposed ends. The shaft 43 may includes a hole 46 extending through a central portion of the shaft 43 for receiving the flexible line 34 that extends perpendicularly through a longitudinal axis of the shaft 43. The shaft 43 may comprise a substantially rigid material such as, for example, an aluminum, steel or plastic material. However, other materials may also be employed.

As illustrated in FIG. 4, a fastening member 47 may extend through the shaft 43 and may selectively engage the flexible line 34 for securing the carriage member 36 to the flexible line 34. In one embodiment of the present invention, the fastening member may comprise a screw that is threadedly coupled to the shaft 43.

A means of actuating 42 the motor 30 may also be provided. The means of actuating 42 the motor 30 may be mountable in a passenger compartment of the vehicle for permitting a user to control the cover assembly 13. The means of actuating 42 the motor 30 may comprise a switch. However, other means of actuating 42 the motor 30 may also be employed.

The motor 30 may be directly connected to a power supply of the vehicle. An alternate power supply may be provided that would prevent a draining of power from the power supply of the vehicle.

Figure 5:
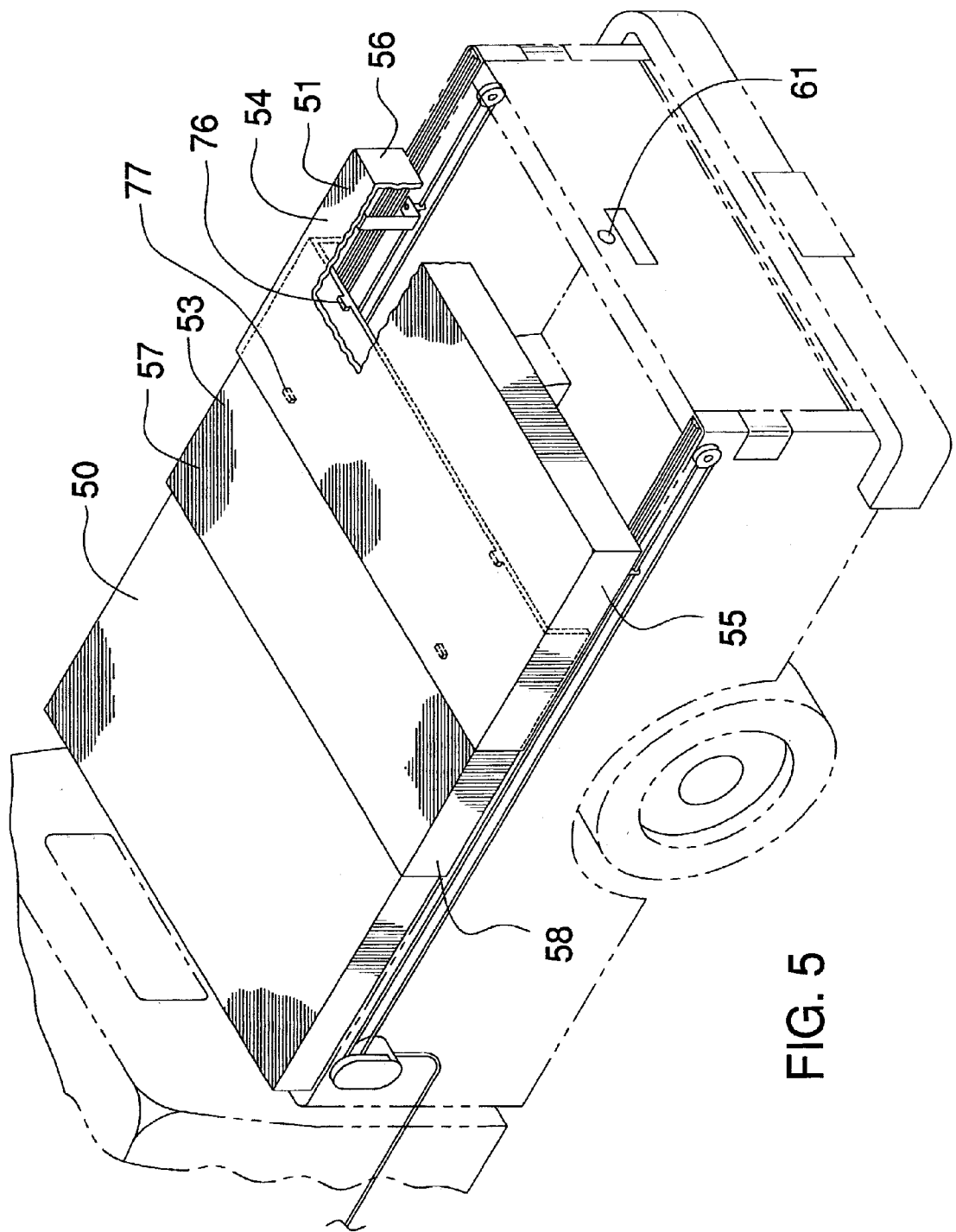
FIG. 5 is a perspective view of an alternate embodiment of the present invention.
Figure 6:
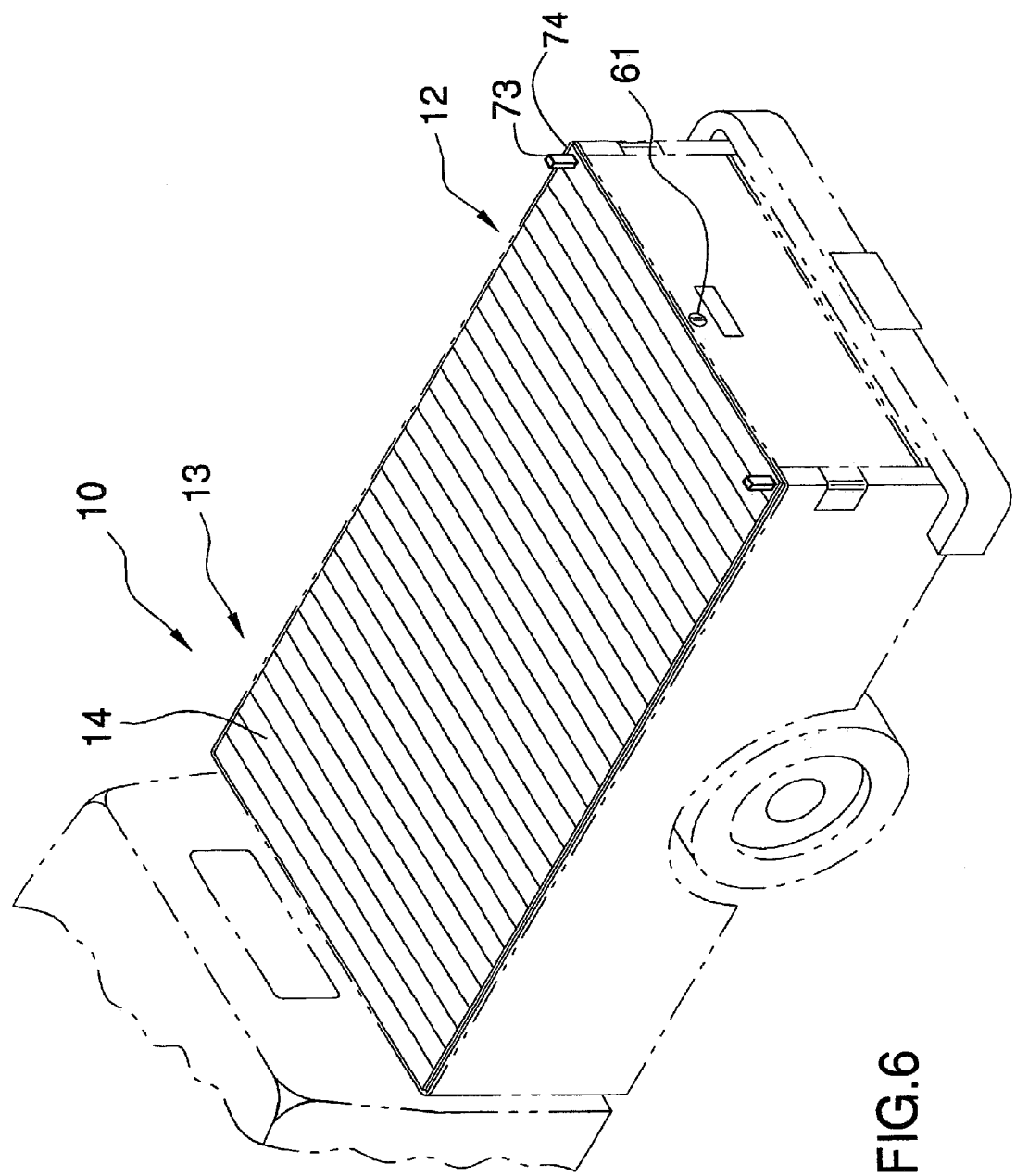
FIG. 6 is a perspective view of an alternate embodiment of the present invention having a pair of retractable arm assemblies.

In another embodiment of the present invention, as illustrated in FIG. 5, the cover member 14 may be generally nonflexible and may include a first cover section 50 and a second cover section 51. The first cover section 50 may be positioned generally adjacent to the end wall of the vehicle. The second cover section 51 may be selectively positioned generally adjacent to the gate. At least one intermediate cover section 53 may be provided that is selectively coupled to and extends between the first 50 and second 51 cover sections. Each of the cover sections 50, 51 and 53 may be telescopically disposed in each other as the cover member 14 moves from the first position toward the second position.

The first 50 and second 51 cover sections may include a top wall 54 and a pair of sidewalls 55 that extend from the top wall 54 toward the sidewall of the vehicle. Each of the sidewalls 55 of the second cover section 51 may be slidably positioned in the track assembly 12 and may be coupled to the carriage member 36. An end wall 56 may extend away from the top wall 54 for preventing access to the cargo area of the vehicle when the cover member 14 is in the second position.

The intermediate cover section 53 may include a top wall 57 and a pair of lateral sidewalls 58 that extend from the top wall 57 toward the sidewalls of the vehicle.

As illustrated in FIG. 5, the top wall 57 of the intermediate cover section 53 may have a at least one projection 76 extending away from an upper surface thereof that selectively engages at least one depression 77 that extends into a lower surface of the top wall 54 of the second cover section 51. The projection engages the depression when the second cover section 51 moves from the second position to the first position, thereby facilitating movement of the intermediate cover section 53.

As illustrated in FIG. 5, a width of the first cover section 50 is generally narrower than the intermediate cover section 53. The intermediate cover section 53 has a width generally narrower than the second cover sections 51. The differences in the widths of the cover sections 50, 51 and 53 is to permit the cover sections 50, 51 and 53 to be telescopically disposed with respect to each other. As particularly illustrated in FIG. 5, the second cover section 51 slides above the intermediate cover section 53 as it moves from the second position toward the first position. The second 50 and intermediate 53 cover sections slide above the first cover section 50 as they both move from the second position toward the first position.

In another embodiment of the present invention, a pair of pulley systems 35 may be provided to ensure that the cover member 14 moves uniformly between the first and second positions. Each of the pulley systems 35 may be mountable to an inner surface of a respective sidewall of the vehicle.

Figure 7:
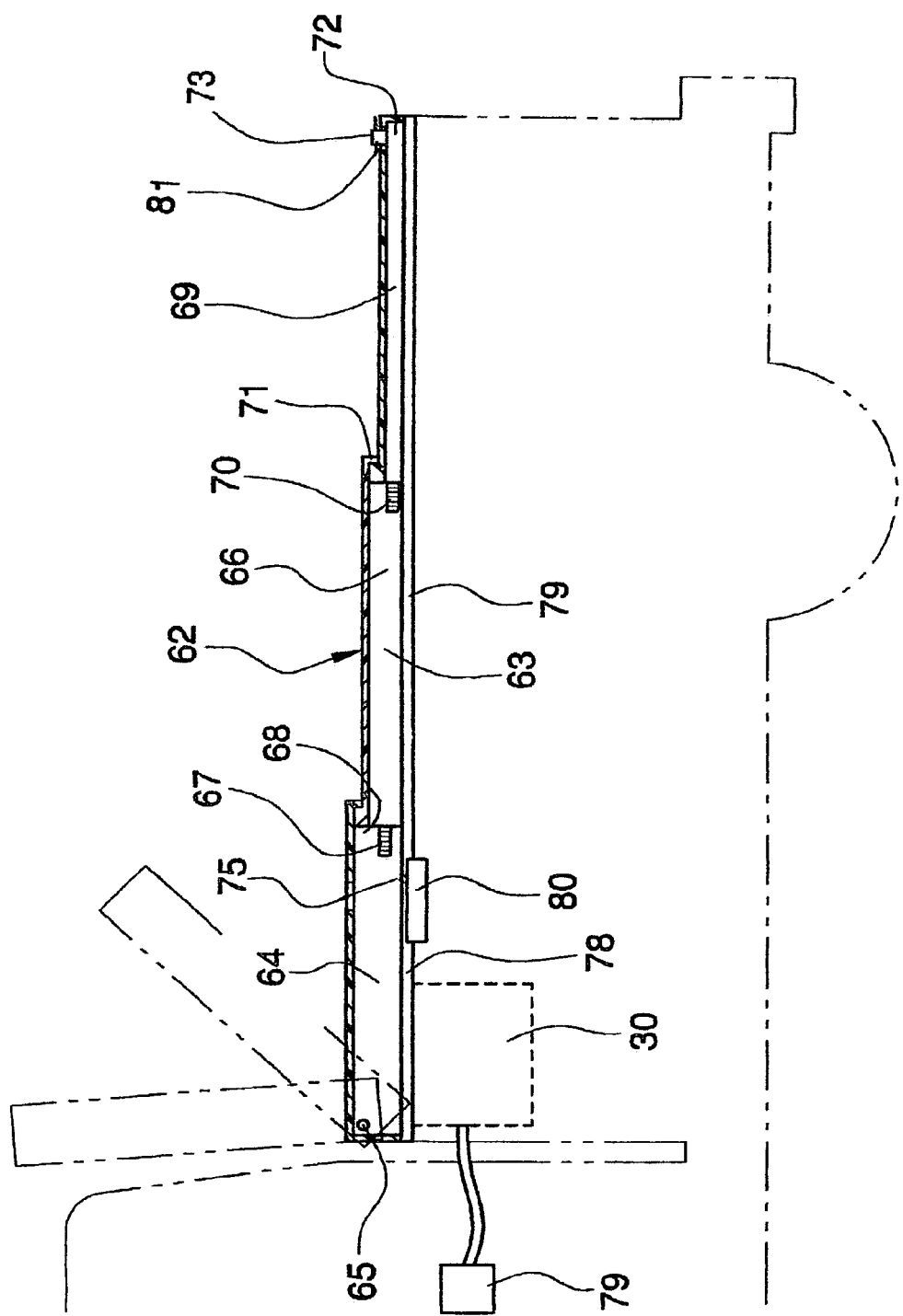
FIG. 7 is a cross sectional view of the present invention taken along line 7—7 of FIG. 6.

In another embodiment of the present invention, as particularly illustrated in FIG. 7, the at least one drive assembly may comprise a pair of retractable arms 62. Each of the retractable arms moves the cover member 14 between its first and second positions. The cover member 14 generally extends between and is coupled to the pair of retractable arms 62 for covering the cargo area of the vehicle. Each of the retractable arms 62 is positionable between an extended position, wherein the cover member 14 is in its first position and a retracted position, wherein the cover member 14 is in its second position.

Each of the retractable arms 62 may include a plurality of telescoping arm segments 63 that are telescopically coupled together. The cover member 14 may be coupled to at least one of the arm segments 63 such that movement of each of the arms 62 between the extended positions and the retracted positions moves the cover member 14 between its first and second positions.

The plurality of arm segments 63 may be positioned in the longitudinal channel 22 of each of the longitudinal track sections 17. The plurality of arm segments 63 may include a first arm segment 64 that has a first end 65 coupled to a portion of the track assembly 12 and is preferably positioned generally adjacent to the end wall of the vehicle. A second arm segment 66 may be provided that has a first end 67 coupled to a second end 68 of the first arm segment 64 such that the second arm segment 66 is telescopically disposable within a bore extending into the second end 68 of the first arm segment 63. A third arm segment 69 may also be provided that has a first end 70 coupled to a second end 71 of said second arm segment 66 such that the third arm segment 69 is telescopically disposable within a bore extending into the second end 71 of the second arm segment 66.

A second end of 72 the third arm segment 69 preferably has a protruding portion 73 extending away therefrom. The protruding portion 73 is slidably positioned in and extends away from the channel 22 of the track assembly 12. The protruding portion 73 travels in the channel 22 and extends through the space 19 when the pair of retractable arms 62 moves between the extended and retracted positions.

The cover member 14 may be coupled to the third arm segment 69. The cover member 14 may have a pair of holes 74 extending therethrough for receiving the protruding portion 73 of the third arm segment 69. Each of the holes 74 may be positioned generally adjacent to an edge of the cover member that is closest to the gate when the cover member 14 is in the second position. A means of fastening 81 the cover member 14 to the third arm segment 69 may be provided such as, for example, a pin removably extendable through the protruding post 73. However, other means of fastening the cover member to the third arm segment may also be provided.

The pair of telescoping arms 62 may be used with the generally flexible cover member 14 or the generally non-flexible cover member 14. If the generally flexible cover member 14 is employed, the plurality of spaced mounting members 25 are slidably positioned in the longitudinal channel 22 of the track assembly 12 and positioned generally above the telescoping arm assembly 62 to slidably fasten the generally flexible cover member 14 to the track assembly 12. If the hard cover member 14 is employed, each of the cover sections 50, 51 and 53 are slidably coupled to the track assembly 12.

In one embodiment of the present invention, each of the track members 16 may have a break 75 extending therethrough for defining a first track section 78 and a second track section 79. An end of the first track section 78 adjacent to a passenger cabin of the vehicle is pivotally couplable to the side wall of the vehicle such that when each of the retractable arms 62 is in the retracted position, each of said first track sections 78 and cover member 14 are pivotally moveable with respect to the cargo area. When the first track sections 78 and cover member 14 are pivotally moved by a user, the user has more access to the cargo area.

Additionally, a means of releaseably securing 80 the first track section to the second track section may be provided to prevent unintended pivotal movement of the first track section. The means of releaseably securing 80 each of the track sections 78 and 79 together may be coupled to an end of the second track section 79 adjacent to the break 75 and may be releaseably couplable to an end of the first track section 78. The means of releaseably securing 80 the track sections 78 and 79 together may comprise conventional securing devices such as, a sliding clasp, a pivoting latch or a pin insertable through both track sections 78 and 79. One skilled in the art could appreciate numerous means of releaseably securing the track sections 78 and 79 together.

Although the cover member 14 and retractable arm assemblies may be operated manually, the motor 30 may be mountable to the vehicle and operationally coupled to the pair of retractable arms 62. The motor 30 may be coupled to one or the pair of arms 62 such that the motor 30 moves each of the arms 62 between the extended and retracted positions. A power supply is electrically connected to the motor 30 for providing power thereto. The power supply may comprise a battery. In one embodiment the motor 30 may be electrically connected to a power supply of the vehicle. The means of actuating 42 the motor 30 may be mountable to the vehicle and electrically connected to the motor 30 for selectively controlling a flow of power from the power supply to the motor 30. Conventional motors, power supplies and actuating members may be employed.

Figure 8:
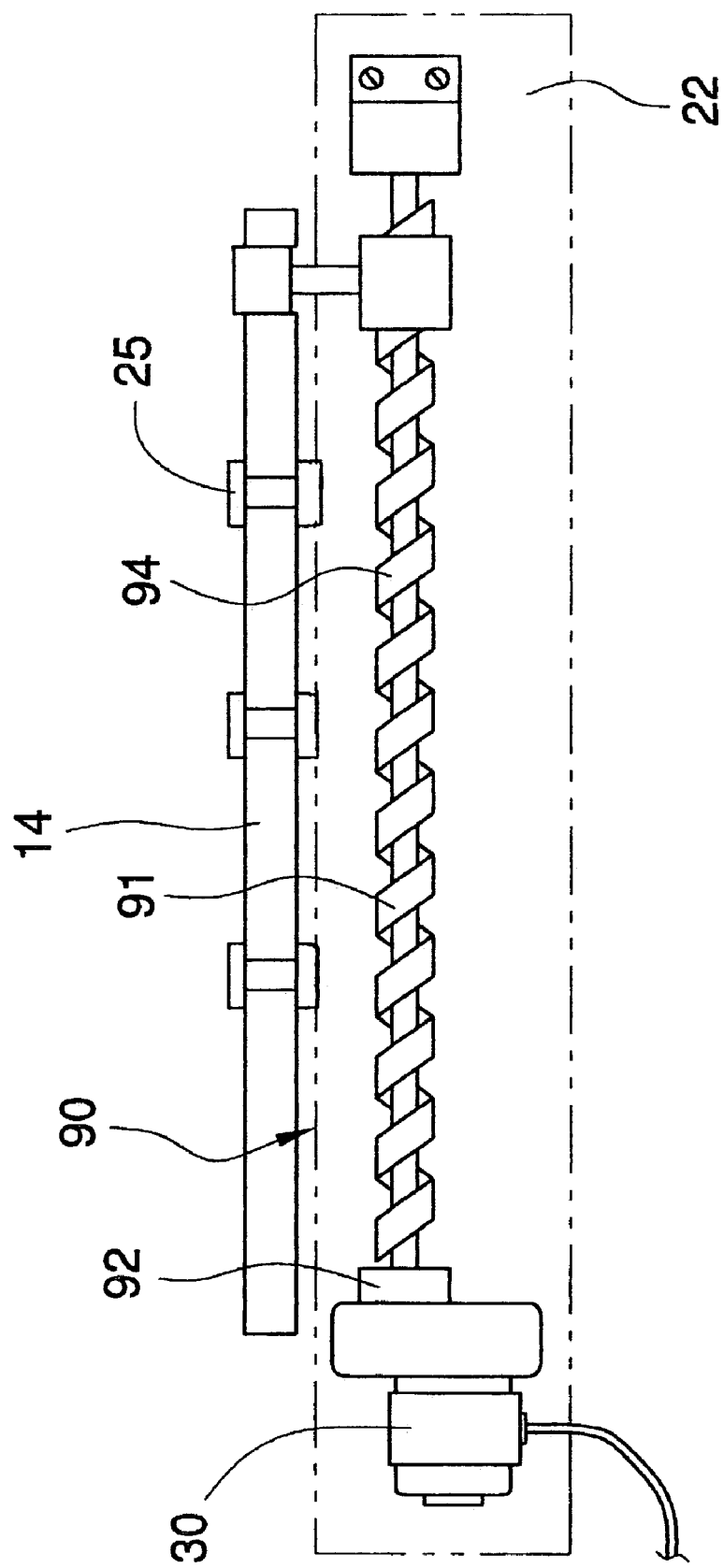
FIG. 8 is a cross sectional view of another embodiment of the present invention.

In another embodiment of the present invention, as illustrated in FIG. 8, the at least one drive assembly 15 may comprise a rotating shaft system 90 being rotatably mounted in the channel 22 of at least one of the track members 16. The rotatable shaft system 90 may be provided for moving the cover member 14 between its first and second positions.

The rotating shaft system 90 may include an elongate rotatable shaft 91 having a pair of opposed ends 92. Each of said opposed ends 92 may be mounted to an inner surface of opposed end walls of the track assembly 12 such that the elongate shaft 92 is orientated generally longitudinally in the elongate channel 22. To ensure uniform movement of the cover member 14 between its first and second positions a pair of elongate rotatable shafts 91 may be employed with each rotatable shaft being positioned in a respective channel 22 of each of the track members 16.

The cover member 14 extends between each of the elongate rotatable shafts 91 and the cover member 14 is slidably secured to the track members 16 by the plurality of spaced mounting members 25. Each of the spaced mounting members 25 is mounted to the cover member 14 and is positioned in the longitudinal channel 22 of the track assembly 12. Each of the plurality of spaced mounting members 25 is positioned generally above the elongate rotatable shaft 91. If the hard cover member 14 is employed, each of the cover sections 50, 51 and 53 are slidably coupled to the track assembly 12.

The motor 30 may be operationally coupled to one of the opposed ends 92 of the elongate rotatable shaft 91 for rotating the elongate rotatable shaft 91. The rotation of the elongate rotatable shaft 91 moves the cover member 14 between its first and second positions.

The elongate rotatable shaft 91 has a ridge portion 94 extending away from an outer surface thereof. The ridge portion 94 that extends about a circumference of the elongate rotatable shaft 91 and extends along a length of the elongate rotatable shaft 91 such that the outer surface of the elongate rotatable shaft 91 has a generally screw configuration.

The cover member 14 is coupled to the elongate rotatable shaft 91 by one of the plurality of mounting members 25 nearest the gate of the vehicle. The mounting member 25 engages the ridge portions 94 such that rotation of the elongate rotatable shaft 91 moves the cover member 14 between its first and second positions.

The means of actuating 42 the motor 30 may be electrically connected to the motor 30 that is operationally coupled to the elongate rotatable shaft 91.

In use, the cover member 14 selectively covers the cargo area of a vehicle. A user choosing to retract the cover member 14 may activate the means of actuating 42 the motor 30. Once activated, the motor 30 rotates the first pulley 31 causing the flexible line 34 to rotate with respect to the first 31 and second 33 pulleys. As the flexible line 34 moves the carriage member 36 that connects the cover member 14 to the flexible line 34 begins to move. As the carriage member 36 moves the mounting members 25 begin to slide in the longitudinal channel 22 of the track members until the cover member 14 is either extended over the cargo area or the cover member 14 is retracted permitting access to the cargo area.

In the embodiment having the generally nonflexible cover member 14, the motor 30 and pulley system 35 causes the second cover section 51 to move from the first position toward the second position. As the second cover section 51 moves over the intermediate cover section 53, the end wall 56 of the second cover section 51 pushes the intermediate cover section 53 over the first cover section 50. When moving from the second position toward the first position the motor 30 and pulley system 35 moves the second cover section 51 over the intermediate cover section 53 until at least one depression 77 in the second cover section 51 receives and engages at least one projection 76 extending away from the intermediate cover section 53. As the second cover section 51 moves it pulls the intermediate cover section 53 along with it until it reaches the cover member 14 is in the first position.

In the embodiment with the pair of retractable arms 62, the pair of retractable arms 62 acts in a manner similar to the pulley system 35. However, in this embodiment, the motor 30 causes the plurality of arm segments 63 to be telescopically nestable within each other as the motor 30 moves the pair of retractable arms 62 between the extended positions toward the retracted positions.

In the embodiment with the rotatable shaft system 90, the motor 30 rotates the elongate rotatable shaft 91. The mounting member 25 closest to the gate of the vehicle engages the ridge portions 94 of the elongate rotatable shaft 91. The ridge portions 94 cause the mounting member to move along a length of the elongate rotatable shaft 91. Since the cover member 14 is mounted to the mounting member 25 engaged with the elongate rotatable shaft 91, the cover member 14 moves from its first and second positions as the elongate rotatable shaft 91 rotates in a clockwise and counterclockwise rotation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the motorized cover system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cover system for covering a cargo area of a vehicle, the vehicle having a pair of opposed sidewalls, an end wall and a pivotally mounted gate defining the cargo area, said system comprising:
   a cover member extending between the side walls of the vehicle;
   an elongate track assembly mountable to an upper surface of the pair of sidewalls for coupling said cover member to the side walls of the vehicle and guiding said cover member between a first position wherein said cover member covers and encloses the cargo area of the vehicle and a second position wherein said cover member is retracted providing access to the cargo area;
   a plurality of spaced mounting members being mounted to said cover member and slidably coupled to said elongate track assembly; and
   at least one drive assembly being mounted to said cover member and at least one of said spaced mounting members for slidably moving said cover member between said first and second positions.

2. The cover system of claim 1, wherein said track assembly includes:
   a pair of track members, each of said track members being mountable to and extending a length of a respective sidewall of the vehicle; and
   a means of fastening each of said track members to the sidewall of the vehicle.

3. The cover system of claim 2, wherein each of said track members includes:
   a pair of opposed side wall portions extending a length of the side walls of the vehicle, each of said opposed side walls portions defining a channel;
   a pair of first longitudinal flange portions, each of said first longitudinal flange portions extending away from a respective opposed side wall portion and generally toward each other, an edge of each of said first longitudinal flange portions defining an opening to said channel; and
   a pair of second longitudinal flange portion extending away from a respective opposed side wall portion and generally away from each other wherein said means of fastening said track assembly extends through each of said second longitudinal flange portions.

4. The cover system of claim 3, additionally including a longitudinal intermediate member being positionable between each of said second flanges and the sidewall of the vehicle for preventing damage to each of the side walls of the vehicle.

5. The cover system of claim 3, wherein each of said spaced mounting members includes:
   a post extendable through said cover member and through said opening of each of said track members;
   a first tab member being mounted to said post and positioned generally adjacent to said cover member; and
   a second tab member being mounted to said post and slidably positionable in said longitudinal channel.

6. The cover system of claim 1, wherein said at least one drive assembly comprises a pulley system having:
   at least one motor having a motor shaft extending away therefrom, said motor being mountable to the sidewall of the vehicle and positionable nearer the end wall of the vehicle;
   a first pulley being rotatably mounted to said motor shaft;
   a second pulley being rotatably mounted to the sidewall of the vehicle and positionable nearer the gate of the vehicle;
   a flexible line being mounted about said first and second pulleys;
   a carriage member being mounted to and extending between said flexible line and said cover member for moving said cover member between said first and second positions; and
   a means of actuating said motor, said means of actuating said motor being mountable in a cabin of the vehicle.

7. The cover system of claim 6, wherein said carriage member includes:
   a bracket being coupled to said cover member; and
   a coupling assembly being mounted to said bracket for coupling said bracket to said flexible line, said flexible line extending through and being coupled to said coupling assembly.

8. The cover system of claim 7, wherein said bracket includes:
   a first flange portion being mounted to said cover member wherein at least one of said coupling members extends through said first flange portion of said bracket;
   a second flange portion being mounted to said coupling assembly, said second flange portion of said bracket being orientated generally parallel to said first flange portion of said bracket; and
   a coupling portion extending between and being coupled to said first and second flange portions of said bracket.

9. The cover system of claim 8, wherein said coupling assembly includes:
- a shaft having first and second opposed ends, said shaft having a hole extending through said shaft wherein said flexible line extends through said hole; and
- a fastening member extending through said shaft and selectively engaging said flexible line for fastening said carriage to said flexible line.

10. The cover system of claim 1, additionally including a means of locking said cover member in said first position, said means of locking said cover member being mountable to the tail gate of the vehicle and extendable between the tailgate of the vehicle and said cover member.

11. The cover system of claim 1, wherein said cover member comprises a generally flexible material such that when said cover member is in said second position said cover member has a plurality of parallel folds.

* * * * *